Patented July 10, 1951

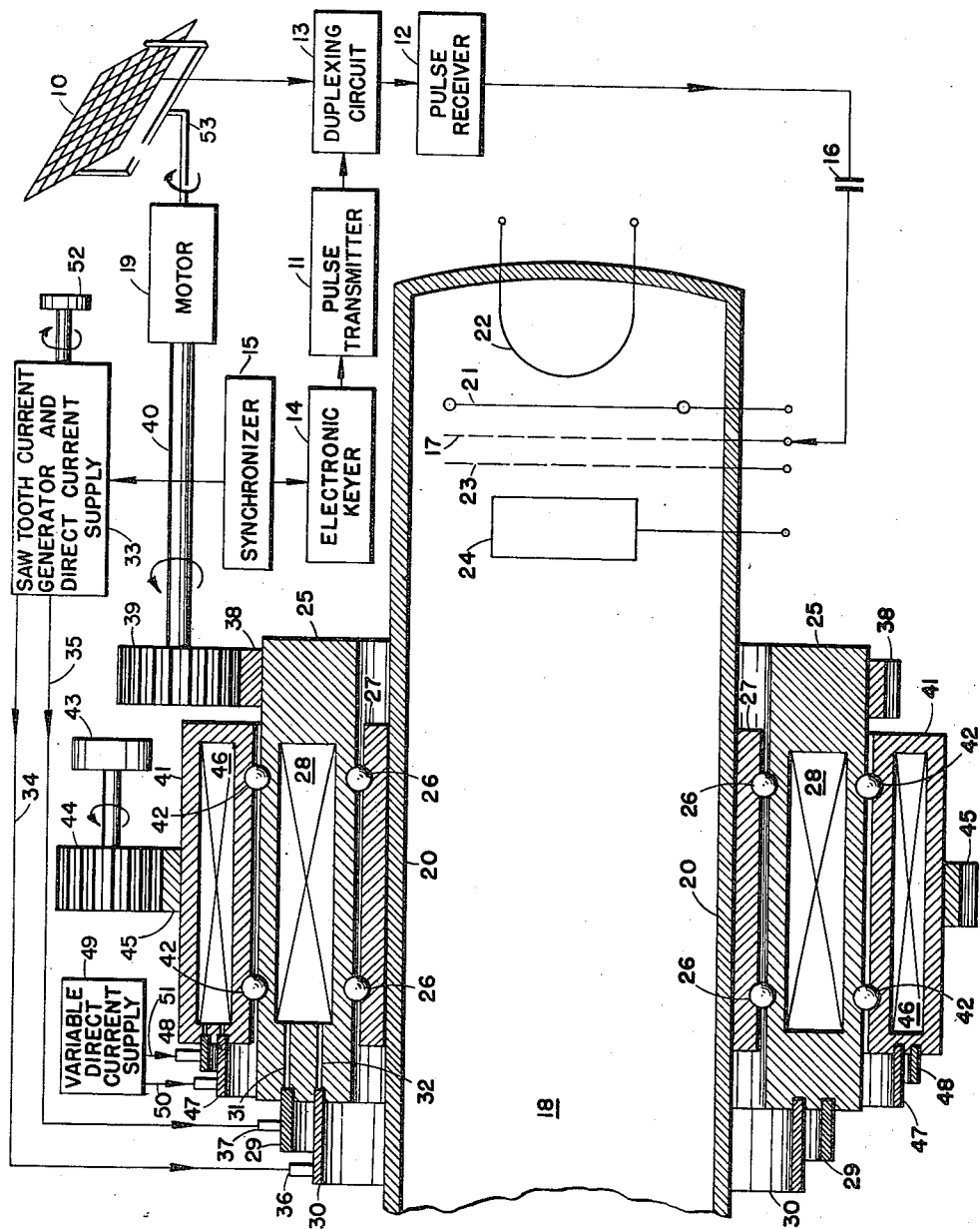

2,559,657

UNITED STATES PATENT OFFICE 2,559,657

SWEEP GENERATION

Robert M. Page, Washington, D. C.

Original application September 19, 1942, Serial No. 459,010. Divided and this application August 27, 1947, Serial No. 770,842

14 Claims. (Cl. 315—24)

(Granted under the act of March 3, 1883, as amended April 30, 1928; 370 O. G. 757)

This invention relates to radio echo apparatus and more particularly to methods of and means for detecting the presence of remote objects included within a field extending 360° about a reference point and for producing a visual plan position indication of such area whereon detected remote objects are indicated in such a manner as to simultaneously show range and direction thereof.

Radio echo apparatuses disclosed by the prior art include a directional beam antenna from which equally spaced energy pulses are emitted at a constant rate, and an indicator, such as a cathode ray oscillograph, upon which a time sweep is impressed in synchronism with the energy pulses emitted from the antenna. When the emitted energy pulses impinge upon remote objects, echo pulses are reflected from the objects and applied to the indicator in such a manner as to produce an indication on the sweep which portrays a measurement of range of the remote object from which the echo pulse reflected. In the prior systems directional indications of remote objects detected in the foregoing manner are derived from the angular position of the directional beam antenna. Directional indications obtained in this manner are not of a high degree of accuracy since the directional energy beam emitted from the antenna must necessarily have substantial widths, approximately equal to an arc of 10 to 15 degrees, and echo pulse indications are therefore produced on the indicator whenever a remote object is included within any portion of the beam. Consequently, it becomes necessary to continually adjust the antenna bearing until echo pulse indications of maximum amplitude are produced, in which case it is assumed that the middle of the directional energy beam, the portion thereof having the greatest power, is directed toward the object, and also that the antenna is likewise pointing directly toward the object. The latter operations are extremely difficult to perform rapidly with a high degree of accuracy and the prior systems are therefore only capable of indicating approximate bearings of remote objects.

From the foregoing it can be readily seen that numerous difficulties arise when attempting to determine range and directional indications of remote objects with a system of conventional construction. As mentioned above, directional indications, when obtained, are not of a high degree of accuracy, and furthermore, it becomes extremely difficult to obtain a directional indication of a remote object corresponding to a remote object indication produced on the indicator since the means for indicating range and bearing are distinct, isolated devices. Difficulties arising because of the latter are more readily comprehended when attempting to determine range and direction of all remote objects included within a field extending 360° about the apparatus. It is necessary, in the latter instance, to slowly rotate the antenna by extremely small increments throughout 360° and to continually record the echo pulse indications appearing on the indicator for each position of the antenna. When considering the tedious operations required to obtain approximate bearing indications, the fallacies of the foregoing method are obvious, especially in instances wherein the remote objects are moving at high velocities, such as aircraft, for example.

It is therefore an object of the present invention to provide a novel method for indicating range and direction of remote objects.

Another object is to provide novel means for indicating range and direction of remote objects.

Another object is to provide novel means for simultaneously indicating range and direction of remote objects on an oscillograph by use of separate coordinates.

Another object is to provide a novel radio echo apparatus for producing a plan position indication of remote objects included within a field extending 360° about the apparatus, with the indication of each object simultaneously showing range and direction thereof.

Still another object of the present invention is to provide a novel method for producing a rotating radial sweep of the electron beam of an oscillograph.

Still another object is to provide novel means for producing a rotating radial sweep of the electron beam of an oscillograph.

Still another object is to provide a radio echo apparatus including novel means for producing a radial time sweep of the electron beam of an oscillograph and for rotating the sweep in synchronism with rotation of antenna of the apparatus whereby range and directional indications of remote objects included within a field extending 360° about the apparatus are simultaneously obtained from the indications produced on the oscillograph.

Still another object is to provide novel electromagnetic means for producing a rotating radial sweep of the electron beam of an oscillograph.

Still another object is to provide a radio echo apparatus having an oscillograph with means for producing a rotating radial sweep of the electron beam thereof, including novel means for varying the point about which the sweep rotates.

Other objects and features of the invention will appear more fully hereinafter from the following detailed description when considered in connection with the accompanying drawing which discloses a radio echo apparatus embodying the principles of the present invention. It is to be expressly understood, however, that the drawing is designed for purposes of illustration only and not as a definition of the limits of the invention, reference for the latter purpose being had to the appended claims.

It is contemplated by the present invention to produce a highly directive beam of energy, such as a series of equally spaced radio frequency pulses, which is continually rotated to scan an area extending 360° about a reference point with the directive energy, and to produce a radial sweep of the electron beam of an oscillograph which rotates about a fixed point on the oscillograph screen in synchronism with rotation of the directional energy beam. The rate of emission of the directional energy is synchronized with the radial sweep of the electron beam so that energy reflected from remote objects included in the scanned area produces indications on the sweep, at certain distances from the rotating ends thereof, which are direct measurements of range of the remote object from which the energy reflected, while the angular position of the sweep, at the instant a reflected energy indication is produced thereon, represents the direction of the remote object. With an apparatus having the foregoing characteristics, a visual plan position indication is produced on the oscillograph screen which portrays the remote objects included within the scanned area at certain radial and angular positions with respect to the center of the oscillograph screen in a manner corresponding to the range and direction of remote objects with respect to the apparatus. An indication of the foregoing type is disclosed and described more fully in the application of Robert M. Page, Serial No. 455,582, filed August 21, 1942, for Radio Echo Apparatus, now abandoned.

With reference more particularly to the drawing, the radio echo apparatus constructed in accordance with the principles of the present invention that is disclosed therein includes directional beam antenna 10, pulse transmitter 11 and pulse receiver 12. Transmitter 11 and receiver 12 are connected to antenna 10 by means of duplexing circuit 13 which automatically functions to form individual connections between the transmitter and the antenna, and between the antenna and the receiver so that a single antenna is employed for transmission as well as reception. The output of transmitter 11 is modulated by electronic keyer 14 in such a manner that the former produces equally spaced energy pulses, such as radio frequency pulses, at a rate determined by synchronizer 15 which controls operation of keyer 14, which are emitted from antenna 10 in the form of a directional energy emission. Energy received at the antenna is passed through receiver 12 and coupling condenser 16 to control grid 17, of oscillograph 18, to modulate the intensity of the electron beam of the oscillograph. Antenna 10 is rotated, in a horizontal plane for example, by means of motor 19 through shaft 53, so that the directional energy pulses omitted from the antenna may be scanned over an area extending 360° about the antenna, or through any desired angle. Antenna 10 is to be of any suitable construction capable of producing a highly directive energy emission, and transmitter 11 and receiver 12 are designed in such a manner as to properly transmit and receive pulse energy, such as transmitters and receivers employed in conventional television equipment. Oscillograph 18 is of conventional construction in so far as the same comprises an evacuated cylindrical envelope 20 having a viewing screen, not shown, at one end, with electron emitting means mounted in the other end thereof. The electron emitting means includes cathode 21, heater element 22, grid 23 and anode 24, from which the electrons are emitted at extremely high velocities toward the viewing screen.

As mentioned heretofore, it is an object of the present invention to provide novel electromagnetic means associated with oscillograph 18 for continually radially deflecting the electron beam emitted from cathode 21 in synchronism with the pulse energy emitted from antenna 10 in a direction corresponding to the direction of the pulse energy emission from the antenna. As shown in the drawing, the foregoing means comprises cylindrical coil supporting member 25 mounted for rotation about the outer periphery of envelope 20 by means of anti-friction bearings 26 which cooperate with member 25 and race member 27; the latter member being secured to the outer periphery of envelope 20, between the electron beam emitting means and the oscillograph viewing screen, by any suitable means. Deflection coils 28, 28 are carried by member 25 and are electrically connected to slip rings 29 and 30 through conductors 31 and 32. The aforementioned means also includes saw-tooth wave generator 33 of conventional design to produce saw-tooth varying currents, as well as a source of constant direct current, the purpose of the latter will appear more fully hereinafter. Synchronizer 15 is connected to generator 33 to control operation of the latter in such a manner that generation of saw-tooth current wave forms are initiated at the instant an energy pulse is generated at transmitter 11. The output of generator is fed to deflection coils, 28, 28 through conductors 34 and 35 which respectfully terminate at contacts 36 and 37 slidably mounted on slip rings 29 and 30.

Deflection coils 28, 28 are diametrically mounted in supporting member 25 and are wound in such a manner as to produce a uniform uni-directional electromagnetic field therebetween, that passes through envelope 20, when a source of direct current is applied thereto. Application of saw-tooth current wave forms to the deflection coils produces uniform electromagnetic fields between the coils, the strength of which varies at a constant increasing rate, from a field of zero strength, at the originating point of the saw-tooth wave forms, to a field of maximum strength when the saw-tooth wave forms attain maximum current values. The electron beam emitted from cathode 21 normally moves along the central axis of envelope 20; however, when a saw-tooth varying electromagnetic field is applied between the deflection coils; the electron beam is deflected, in a direction at right angles to the direction of the electromagnetic field, by an amount directly proportional to the strength of the field. It is to be expressly understood, therefore, that the electron beam is radially moved from the center of the oscillograph screen upon application of each saw-tooth wave form to the deflection coils. When a series of saw-tooth current wave forms are applied to the deflection coils, a constant direct current, the average current value of the saw-tooth wave forms, produces a constant electromagnetic field between the coils. The constant field tends to maintain the electron beam at some position remote from the central axis of envelope 20. Since, as mentioned heretofore, an object of the present invention is to produce a radial sweep of the electron beam, that is, a sweep that originates at the center of the oscillograph screen, a source of direct current is also applied to the deflection coils, by way of conductors 34 and 35, of the proper polarity to produce an electromagnetic field in opposition to the constant field produced by the aforementioned average direct current. With the foregoing arrangement the electron beam is radially moved from the center of the oscillograph screen upon application of each saw-tooth current wave form.

In order to rotate the radial sweep of the electron beam in synchronism with rotation of antenna 10 in such a manner that the electron beam continually moves in a direction corresponding to the direction of emission of the directional energy from the antenna, means are provided for synchronizing the angular positions of coil supporting member 25 and antenna 10, and for rotating the member and the antenna in such a manner as to continually maintain such synchronous angular relationship. As shown, the foregoing means comprises annular gear 38, secured to the outer periphery of coil supporting member 25 at one end thereof, and pinion 39, rotatably connected to motor 19 through shaft 40, which cooperates with annular gear 38. The driving connections between motor 19 and antenna 10, and between the motor and coil supporting member 25, are so designed that coil supporting member 25 rotates through a complete revolution during the time required to rotate antenna 10 throughout 360°, while the coil supporting member is angularly positioned about the oscillograph in such a manner that the electron beam moves in a direction corresponding to the direction of emission of the directional energy from the antenna.

As previously mentioned, means are provided by the present invention for varying the point about which the radial sweep of the electron beam rotates to any desired position within or outside the oscillograph screen. By varying the point about which the radial sweep rotates, and by expanding the length of the sweep, any desired portion of the area scanned by the directional energy emitted from the antenna may be indicated on the entire area of the oscillograph screen. With an arrangement having the foregoing characteristics, indications of objects at extreme remote positions with respect to the apparatus, are obtained in such a manner that range and directional indications thereof are rapidly obtained with a high degree of accuracy, as will appear more fully hereinafter.

The foregoing means comprises cylindrical coil supporting member 41 rotatably mounted about the outer periphery of member 25 by means of anti-friction bearings 42. Member 41 is rotated upon manual movement of knob 43 which is secured to pinion 44, while the latter element cooperates with annular gear 45 mounted on the outer periphery of member 41. Deflection coils 46, 46 are carried by member 41 in diametric relation, and are wound in such a manner as to produce a uniform uni-directional electromagnetic field between the coils, and through envelope 20, when a source of direct current is applied to the coils. The deflection coils are connected to slip rings 47 and 48 carried by member 41. The output of variable direct current supply 49 is fed to deflection coils 46, 46 through conductors 50 and 51, each of which terminate in contacts that cooperate with slip rings 47 and 48. When it is desired to move the point about which the radial sweep of the electron beam rotates, the output of supply 49 is regulated until the direct current fed to coils 46, 46 produces an electromagnetic field of sufficient strength to deflect the electron beam of the oscillograph the desired amount from the center of the oscillograph screen. Member 41 is then rotated, upon manual movement of knob 43, to vary the direction that the electron beam is moved until the desired angular position thereof is obtained. In order to expand the radial sweep of the electron beam, the amplitude of the saw-tooth current wave forms from generator 33 is increased upon adjustment of control 52 associated with the generator.

As mentioned heretofore, transmitter 11 produces a series of equally spaced energy pulses, such as radio frequency pulses, upon operation of keyer 14, at a rate controlled by synchronizer 15, which are emitted from antenna 10 in the form of a highly directive energy pulse emission. Synchronizer 15 also controls operation of saw-tooth generator 33 in such a manner that generation of a saw-tooth current wave form is initiated at the instant an energy pulse is generated at the transmitter. The saw-tooth varying current output, as well as a source of direct current, from generator 33 is applied to deflection coils 28, 28 to produce a uni-directional saw-tooth varying electromagnetic field within envelope 20 which radially deflects the electron beam emitted from anode 24, upon application of each saw-tooth wave form to the coils. Since antenna 10 and coil supporting member 25 are synchronously rotated upon operation of motor 19, the electron beam continually radially sweeps in a direction corresponding to the direction that the energy pulses are emitted from the antenna.

When antenna 10 is continually rotated to scan an area extending 360° about the antenna with the directional energy emission, the energy pulses impinge upon and reflect from all remote objects included within the scanned area. The reflected energy pulses are received at antenna 10, passed through receiver 12 and applied to control grid 17 of oscillograph 18, by way of condenser 16, to modulate the intensity of the electron beam thus producing a visual indication on the oscillograph screen. Since the electron beam initiates radial movement in a direction corresponding to the direction of the pulse energy emission from the antenna, whenever an energy pulse is emitted, the electron beam is modulated, in response to reception of reflected energy pulses corresponding to the energy pulse emitted at the instant radial movement of the electron beam initiated, when the same occupies a certain radial distance from the center of the oscillograph screen that is a direct measurement of range of the object from which the energy pulse reflected, while the angular position of the radial sweep at the instant the indication is produced thereon indicates the direction, or azimuth angle, of such object.

In the event that more accurate range and directional indications of a certain remote object detected in the foregoing manner is desired, the radial sweep of the electron beam is expanded by increasing the amplitude of the saw-tooth current wave forms by adjustment of control 52, and supply 49 is regulated to apply a source of direct current to deflection coils 46, 46 to produce a uni-directional electromagnetic field that deflects the electron beam in a direction determined by the angular position of the deflection coils. The angular position of deflection coils 46, 46 is varied, upon rotation of knob 43, to occupy a position wherein the electron beam is deflected in a direction substantially opposite the direction of the remote object of which an indication is desired, with respect to the antenna, while the current fed to the deflection coils is regulated in such a manner as to move the electron beam to a new point of rotation that is sufficient distance in the aforesaid direction from the center of the oscillograph screen so that the expanded radial sweep utilizes the entire diameter of the screen. Since deflection coils 46, 46 are capable of rotation throughout 360° any remote object included within the scanned area may be individually indicated in the foregoing manner.

There is thus provided by the present invention novel methods of and means for simultaneously indicating range and direction, or the azimuth angle, of remote objects on the screen of an oscillograph, or any other suitable indicating device. The novel means disclosed and described herein is so characterized that a visual plan position indication of all remote objects included within an area extending 360° about a reference point is readily obtained, wherein remote objects are indicated on the viewing screen of an oscillograph at radial and angular positions with respect to the center of the screen that respectively correspond to ranges and azimuth angles of remote objects with respect to the reference point. Furthermore, the present invention provides novel electromagnetic means for producing an extremely stable radial sweep in synchronism with rotation of a remote rotatable member with a high degree of accuracy, as well as providing other novel means for varying the point about which the radial sweep rotates to any desired position so that extremely accurate range and directional indications of preselected remote objects may be readily obtained.

Although several modifications of the present invention have been shown and described in detail herein, it is to be expressly understood that various changes and substitutions may be made therein without departing from the spirit of the invention as well understood by those skilled in the art. Reference therefore will be had to the appended claims as a definition of the limits of the invention.

The invention described herein may be manufactured and used by or for the Government of the United States of America for governmental purposes without the payment of any royalties thereon or therefor.

This case is a division of my application Serial Number 459,010, filed September 19, 1942; for Radio Echo Apparatus.

What is claimed is:

1. The method of producing a rotating radial sweep of the electron beam of a cathode ray tube which comprises producing a uniform periodic linearly varying electromagnetic field across the path of said electron beam and rotating said field at a frequency low with respect to the periodicity of said field.

2. The method of producing a rotating radial sweep of the electron beam of a cathode ray tube which comprises producing a uniform periodic linearly varying electromagnetic field across the path of said electron beam, applying a constant uni-directional electromagnetic field across the path of said electron beam in opposition to a constant uni-directional electromagnetic field corresponding to the average of said periodic linearly varying field, and rotating said fields in unison.

3. The method of producing a rotating radial sweep of the electron beam of an oscillograph which comprises applying periodic linearly varying currents to diametrically opposed deflection coils mounted about the oscillograph for producing a periodic linearly varying electromagnetic field across the path of said electron beam, and rotating said field.

4. The method of producing a rotating radial sweep of the electron beam of a cathode ray tube which comprises applying saw-tooth currents to diametrically opposed deflection coils mounted about the tube for producing a periodic linearly varying electromagnetic field across the path of said electron beam, applying a source of constant direct current to said deflection coils in such a manner as to produce a constant uni-directional electromagnetic field across the path of said electron beam in opposition to a constant uni-directional electromagnetic field produced by the average current value of said saw-tooth currents, and rotating said fields.

5. An apparatus for producing a rotating radial sweep of the electron beam of a cathode ray tube comprising means producing a uniform periodic linearly varying electromagnetic field across the path of said electron beam, and means rotating said field.

6. In an apparatus for producing a rotating radial sweep of the electron beam of a cathode ray tube, means producing a periodic linearly varying electromagnetic field across the path of said electron beam, means applying a constant uni-directional electromagnetic field in opposition to a constant uni-directional electromagnetic field corresponding to the average of said linearly varying field, and means rotating said fields in unison.

7. In an apparatus for producing a rotating radial sweep of the electron beam of a cathode ray tube, means applying a deflection wave including saw-tooth varying currents and a direct current component to diametrically opposed deflection coils rotatably mounted about the tube for producing a linearly varying electromagnetic field in quadrature with the path of said electron beam and initiating at a point within the tube coincident with the beam, and means rotating said coils.

8. In an apparatus for producing a rotating radial sweep of the electron beam of a cathode ray tube, means applying saw-tooth varying currents to diametrically opposed deflection coils rotatably mounted about the tube for producing a periodic linearly varying electromagnetic field transverse the path of said electron beam, means applying a source of constant direct current to said coils for producing a constant uniform uni-directional electromagnetic field in opposition to a constant uni-directional electromagnetic field produced by the average current value of said saw-tooth varying currents so that the linearly varying field initiates at a point within the tube coincident with the beam, and means rotating said coils.

9. In an apparatus for producing a rotating radial sweep of the electron beam of a cathode ray tube, diametrically opposed deflection coils rotatably mounted about said cathode ray tube, means applying saw-tooth varying currents and a direct current component to said coils for producing a periodic linearly varying electromagnetic field in quadrature with the path of said electron beam and initiating at a point within the tube coincident with the beam, and means rotating said coils at a frequency low with respect to the periodicity of said field.

10. In an apparauts for producing a rotating radial sweep of the electron beam of an oscillograph, diametrically opposed deflection coils rotatably mounted about said oscillograph, means applying saw-tooth varying currents to said coils for producing a periodic linearly varying electromagnetic field transverse the path of said electron beam, means applying a source of direct current to said coils for producing a uniform constant electromagnetic field in opposition to a constant uni-directional electromagnetic field produced by the average current value of said saw-tooth varying currents so that the periodic linearly varying field initiates within the tube coincident with said beam, and means rotating said coils at a frequency low with respect to the periodicity of said linearly varying field.

11. In combination, a cathode ray tube including means producing a beam of electrons, a pair of diametrically opposed deflection coils rotatably mounted about the cathode ray tube, means applying a deflection wave including saw-tooth varying currents and a direct current component to said coils for producing a periodic linearly varying electromagnetic field transverse the path of said electron beam and initiating at a point within the tube coincident with the beam whereby the electron beam is deflected at right angles to the field proportional to the strength of the field, and means rotating said coils.

12. In an apparatus of the class described, oscillographic means having means for producing an electron beam, deflection means for producing a radial sweep of the electron beam, means for rotating the radial sweep, and electromagnetic means for positionally controlling the electron beam to vary the point about which the radial sweep rotates.

13. In combination, an oscillograph including means producing an electron beam, a pair of deflection coils rotatably mounted about said oscillograph, means applying saw-tooth varying currents and direct current to said coils for radially sweeping said electron beam, means rotating said coils for rotating said radial sweep, a second pair of deflection coils rotatably mounted about said oscillograph, means applying direct current to said second pair of coils for displacing the point about which said sweep rotates, and means rotating said second pair of coils for varying the angular position of said displaced point.

14. In combination, an oscillograph including means producing an electron beam, a pair of deflection coils rotatably mounted about said oscillograph, means applying saw-tooth varying currents and direct current to said coils for radially sweeping said electron beam, means rotating said coils for rotating said radial sweep, a second pair of deflection coils rotatably mounted about said oscillograph, means applying direct current to said second pair of coils for displacing the point about which said radial sweep rotates, means varying said direct current for controlling the degree of displacement of said point, means varying the amplitude of said saw-tooth varying currents for expanding the radial movement of said electron beam and means rotating said second pair of coils for varying the angular position of said displaced point.

ROBERT M. PAGE.

REFERENCES CITED

The following references are of record in the file of this patent:

UNITED STATES PATENTS

| Number | Name | Date |
|---|---|---|
| 1,535,329 | MacGregor-Morris et al. | Apr. 28, 1925 |
| 1,933,219 | Nakajima et al. | Oct. 31, 1933 |
| 2,007,380 | Morlock | July 9, 1935 |
| 2,098,390 | Iams | Nov. 9, 1937 |
| 2,241,809 | De Forest | May 13, 1941 |
| 2,380,929 | Ahier et al. | Aug. 7, 1945 |
| 2,412,291 | Schade | Dec. 10, 1946 |
| 2,412,669 | Bedford | Dec. 17, 1946 |

FOREIGN PATENTS

| Number | Country | Date |
|---|---|---|
| 542,634 | Great Britain | Jan. 21, 1942 |